US012413947B2

(12) United States Patent
Coutelou et al.

(10) Patent No.: US 12,413,947 B2
(45) Date of Patent: Sep. 9, 2025

(54) DEVICE MOBILITY IN STAR TOPOLOGY NETWORK

(71) Applicant: Schneider Electric Industries SAS, Rueil Malmaison (FR)

(72) Inventors: Olivier Coutelou, Grenoble (FR); Thierry Chiche, Saint Ismier (FR); Loïc Caseras-Noale, Dirac (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 720 days.

(21) Appl. No.: 17/723,566

(22) Filed: Apr. 19, 2022

(65) Prior Publication Data

US 2022/0345969 A1 Oct. 27, 2022

(30) Foreign Application Priority Data

Apr. 27, 2021 (EP) ..................................... 21305539

(51) Int. Cl.
*H04W 4/80* (2018.01)
*H04W 36/30* (2009.01)
*H04W 88/16* (2009.01)

(52) U.S. Cl.
CPC ........... *H04W 4/80* (2018.02); *H04W 36/302* (2023.05); *H04W 88/16* (2013.01)

(58) Field of Classification Search
CPC ...... H04W 4/80; H04W 36/302; H04W 88/16
See application file for complete search history.

(56) References Cited

U.S. PATENT DOCUMENTS

| 9,820,132 | B2 * | 11/2017 | Palin ..................... H04W 12/50 |
| 2018/0234900 | A1 * | 8/2018 | Sankaranarayan ... H04W 76/30 |
| 2018/0337803 | A1 * | 11/2018 | Sauerwein, Jr. .......... H04L 9/32 |

OTHER PUBLICATIONS

Extended European Search Report dated Nov. 9, 2021 for corresponding European Patent Application No. 21305539.5-1215, 10 pages.

* cited by examiner

*Primary Examiner* — Ricky Q Ngo
*Assistant Examiner* — Stephen N Steiner
(74) *Attorney, Agent, or Firm* — Troutman Pepper Locke LLP

(57) ABSTRACT

A method for managing mobility of communication devices, wherein a gateway manager is connected to a set of gateways, each gateway being paired with at least one communication device through wireless links and each communication device being paired to only one gateway, wherein a first database linked to the gateway manager includes primary vectors containing an identifier of a gateway, an identifier of communication device and quality metrics, the method including:
the gateways storing, for each received message sent from communication devices, a secondary vector including an identifier of the communication device, a timestamp and quality metrics pertaining to the radio link between the gateway and the communication device,
the gateway manager collecting the secondary vectors from all the gateways and storing the collected secondary vectors in correspondence respectively with identifiers of the gateways in a manager database,
the gateway manager selecting, based on the quality metrics, a secondary vector among secondary vectors that contain the same identifier of communication device and contain timestamps included in a predefined time interval,
the gateway manager commanding the pairing of the communication device corresponding to the identifier of communication device of the selected secondary vector with the gateway corresponding to the identifier of a gateway of the selected secondary vector, if the selected secondary vector has better quality metrics than a given primary vector having the same identifier of communication device in the pairing (Continued)

database and if the selected secondary vector has an identifier of gateway different from the identifier of gateway of said given primary vector.

11 Claims, 2 Drawing Sheets

DEVICE MOBILITY IN STAR TOPOLOGY NETWORK

FIELD OF INVENTION

The present invention generally relates to industrial automation systems, and more particularly relates to wireless device mobility in networks having a star topology.

BACKGROUND

The Internet of Things (IoT) is an essential element of the digital development of companies. On many markets, connected objects capture valuable information. Industrial IoT devices are mainly sensors linked to machines that are located in different areas of industrial sites and measure, record, and send operating data to a data center to be analyzed. These sensors are for example wireless devices that are powered by an internal battery.

In networks having a star topology, communication devices such as wireless sensors are permanently connected and paired to a unique gateway and communicate only with the paired gateway. Any packet exchange between communication devices must go through the gateway, thus advantageously packets go through at most one wireless hop to reach their destination. The disadvantage of this star topology is the operation of the network that depends on the gateway of the network, and as all packets must go through the gateway, the gateway may become bottlenecked.

When a communication device is out of range of its paired gateway, messages sent by said communication device are lost, and even if the message are received by another gateway (not paired with the wireless sensor), the messages will not be processed.

There is therefore a need for supporting efficiently mobility of communication devices in networks having a star topology.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for managing mobility of communication devices, wherein a gateway manager is connected to a set of gateways, each gateway being paired with at least one communication device through wireless links and each communication device being paired to only one gateway, wherein a first database linked to the gateway manager comprises primary vectors containing an identifier of a gateway, an identifier of communication device and quality metrics, the method comprising:

the gateways receiving messages sent from communication devices, each message containing an identifier of communication device,
the gateways determining quality metrics for each received message, the quality metrics pertaining to the radio link between the gateway and the communication device,
the gateways storing, for each received message, a secondary vector comprising the identifier of the communication device, a timestamp and the quality metrics,
the gateway manager collecting the secondary vectors from all the gateways and storing the collected secondary vectors in correspondence respectively with identifiers of the gateways in a manager database,
the gateway manager selecting, based on the quality metrics, a secondary vector among secondary vectors that contain the same identifier of communication device and contain timestamps included in a predefined time interval,
the gateway manager commanding the pairing of the communication device corresponding to the identifier of communication device of the selected secondary vector with the gateway corresponding to the identifier of a gateway of the selected secondary vector, if the selected secondary vector has better quality metrics than a given primary vector having the same identifier of communication device in the pairing database and if the selected secondary vector has an identifier of gateway different from the identifier of gateway of said given primary vector.

Advantageously, the system presents less wireless pollution compared to a network having a mesh topology and provides a balanced communication device allocation between gateways.

In an embodiment, the gateway manager and the gateways form a network with star topology.

In an embodiment, when a gateway is paired with a communication device, the pairing database comprises a primary vector containing the identifier of said gateway and the identifier of said communication device.

In an embodiment, the gateway manager is further configured to command the unpairing of the communication device corresponding to the identifier of communication device of the selected secondary vector with the gateway corresponding to the identifier of a gateway of said given primary vector.

In an embodiment, the gateway manager selects the secondary vector with the best quality metrics among the compared secondary vectors.

In an embodiment, the quality metrics comprise a received signal strength indicator and a link quality indicator.

In an embodiment, the messages are sent in broadcast by the communication devices.

In an embodiment, the pairing database is updated regularly with the secondary vectors stored by the gateways manager database by replacing values of the quality metrics of a primary vector having a given identifier of a gateway and a given identifier of communication device with values of the quality metrics of a secondary vector having the same given identifier of a gateway and the same given identifier of communication device.

In an embodiment, the gateway manager compares the quality metrics of the selected secondary vector to the quality metrics of the primary vector added to a margin and commands the new pairing of the communication device if the quality metrics of the selected secondary vector is higher than to the sum of the quality metrics of the primary vector and said margin.

In an embodiment, the messages further contain operating data and only the gateway paired with a given communication device is able to process the operating data of a message sent by said given communication device.

In an embodiment, a gateway that is paired with a communication device allocates a dedicated channel by reserving memory zones for storing operating data coming from the communication device.

In an embodiment, each gateway is paired with at least one communication device through short range wireless links.

In another implementation there is provided a system comprising a gateway manager and gateways connected to the gateway manager, each gateway being paired with at least one communication device through wireless links and each communication device being paired to only one gateway, the system comprising:
- a pairing database linked to the gateway manager and comprising primary vectors containing an identifier of a gateway, an identifier of communication device and quality metrics,
- the gateways configured to receive messages sent from communication devices, each message containing an identifier of communication device,
- the gateways configured to determine quality metrics for each received message, the quality metrics pertaining to the radio link between the gateway and the communication device,
- the gateways configured to store, for each received message, a secondary vector comprising the identifier of the communication device, a timestamp and the quality metrics,
- the gateway manager configured to collect the secondary vectors from all the gateways and storing the collected secondary vectors in correspondence respectively with identifiers of the gateways in a manager database,
- the gateway manager configured to select, based on the quality metrics, a secondary vector among secondary vectors that contain the same identifier of communication device and contain timestamps included in a predefined time interval,
- the gateway manager configured to command the pairing of the communication device corresponding to the identifier of communication device of the selected secondary vector with the gateway corresponding to the identifier of a gateway of the selected secondary vector, if the selected secondary vector has better quality metrics than a given primary vector having the same identifier of communication device in the pairing database and if the selected secondary vector has an identifier of gateway different from the identifier of gateway of said given primary vector.

In another implementation there is provided a computer-readable medium having embodied thereon a computer program for executing a method for managing mobility of communication devices. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
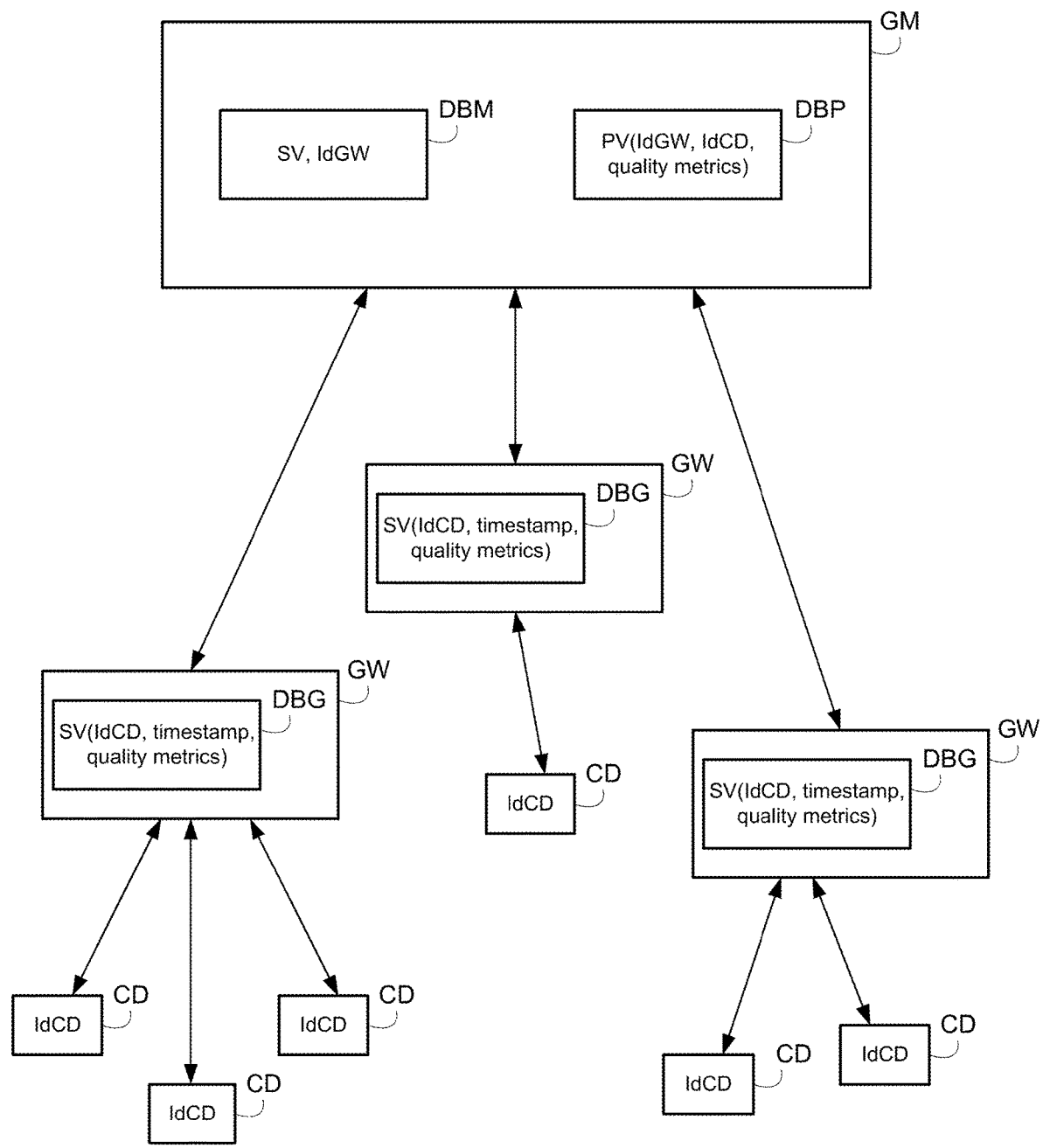
FIG. 1 shows a schematic block diagram of a communication system according to one embodiment of the invention for managing mobility of communication devices.

Referring to FIG. 1, a communication system comprises a gateway manager GM and a set of gateways GW communicating with communication devices CD, wherein the gateway manager GM is connected to the set of gateways in a star topology through wired or wireless links and the gateways GW are paired with communication devices CD through wireless links. The gateway manager GM and the gateways GW form a network with star topology, in which all gateways GW as nodes are individually connected to the gateway manager GM as a central connection point.

The gateway manager GM is connected to the set of gateways GW through wired or wireless links, forming a packet network, for example, an IP ("Internet Protocol") high-speed network such as the Internet or an intranet, or even a company-specific private network. Communications between the gateway manager GM and the set of gateways may be based on a TCP/IP protocol. The gateway manager GM manages dynamically the pairing of any communication device to the most appropriate gateway GW with respect to quality metrics relating to radio link. The gateway manager GM is able to consider the quality of the radio link of a message sent by the communication device and received by the different gateways in the radio range of the communication device.

A gateway GW can be connected to one or several communication devices through wireless link, for example based on as Zigbee or Bluetooth low energy or other short range technologies. In another example, the gateways GW are part of a telecommunication network that is a public wireless network of limited scope, such as WLAN (Wireless Local Area Network) or conforming to a standard 802.1x, or medium range according to the protocol WiMAX (World Wide Interoperability Microwave Access.

A communication device CD is able to send operating data to a data center or a local application to be analyzed and processed. The communication device CD sends the operating data to the data center through the gateways toward the gateway manager that the appropriate data center or application for the analyze of data. The communication device CD can be any type of Industrial IoT devices able to send operating data. Some communication devices CD may be powered by an internal battery or self-powered. or using any power supply using energy harvesting solution (e.g. piezo, electromagnetic generator, photovoltaic . . . ).

The communication device CD may be any type of sensor, such as a pressure sensor, fluid level detector, electrical current/voltage meter, pH-meter, leakage/strain detector, incident or occurrence counter, or velocity/acceleration meter. Thus, any sensor capable of measuring a particular sensor value or capturing a particular event may be connected to a gateway GW. Furthermore, the communication devices CD may be a sensor able to measure temperature, humidity and temperature, or energy measurement etc. The communication device CD may be also any type of push button or device as a wearable command.

The communication device CD may be any type of actuator that performs an action causing a machine or other entity to operate or modifying the state or behavior of such a machine. For example, an actuator may be associated with a lighting device signaling an alarm or a call for action.

A communication device CD can be paired with only one gateway GW whereas one gateway can be paired with several communication devices. When a gateway GW is paired with a communication device CD, the gateway allocates a dedicated channel for communication with the communication device. The dedicated channel reserves memory zones of a memory of the gateway for storing operating data coming from the communication device.

A gateway GW can manage a limited number "Y" of channels, "Y" being an integer, each channel being dedicated to the transmission of data between the gateway and a communication device paired with the gateway. If there is a number of paired communication devices that is less than the limited number of channels, it is assumed there is free space for new commissioning of communication device(s) that can be paired with the gateway and use the remaining channel(s).

After commissioning and during operation, a communication device CD sends messages in a broadcast way, without knowing the gateway which is paired with it. A message sent by a communication device contains an identifier IdCD of the communication device and operating data, like a value of a measure by the wireless sensor. The gateway GW paired with the communication device CD can identify this latter thanks to the identifier IdCD of the communication device contains in the message and can process the payload of the message, i.e. the operating data, via the dedicated channel associated with the communication device.

When a gateway GW receives a message from a communication device CD that is not paired with the gateway, the payload of the message is ignored, thus the operating data are not processed. However the gateway GW can analyze the signal characteristics of the received message.

The operating data may be exchanged in messages in accordance with the Modbus/TCP communication protocol. Modbus/TCP is a communication protocol that makes it possible to exchange frames in accordance with the Modbus protocol for the application layer (layer 7) of the ISO (International Standards Organization) model, and to convey these Modbus frames on an Ethernet network using the ISO layers of the TCP/IP standard.

In one embodiment, a gateway GW manages an operating table, called ModBus table, for the communication devices paired to it, the table listing for each identifier IdCD of communication device a set of "Z" words, wherein each word contains 2 bytes.

In other words, the gateway GW manages a table comprising a data space of Z ModBus words to store the operating data coming from each paired communication device.

At regular time intervals, for example every "N" seconds with "N" being an integer, the ModBus table of each gateway GW is transmitted (or read by) to the gateway manager GM to feed a ModBus Network database.

The ModBus Network database can then be used by different applications using operating data, like applications for power monitoring or temperature monitoring, in reference with the identifiers of communication devices.

The gateway manager GM and the gateways GW are synchronized in time, for example by using a shared clock or by updating regularly the clock of the gateways GW.

A gateway GW can receive messages from any communication device, in the radio range, but can only process operating data of messages sent by a communication device that is paired with the gateway.

Any message received by a gateway GW is analyzed by the gateway to determine quality metrics of the radio link between the gateway and the communication device having sent the message. The quality metrics can comprise, but not limited to, a received signal strength indicator (RSSI) and a link quality indicator (LQI). The LQI is an indication of the quality of the data packets of a message received by the gateway and the RSSI can be used as a measure of the signal strength of the message received by the gateway.

Each gateway stores in a gateway database DBG, for each received message, a secondary vector SV comprising the identifier IdCD of the communication device having sent the message, a timestamp corresponding to the time of reception of the message and the quality metrics.

At regular time intervals, for example every "M" seconds with "M" being an integer, the content of the gateway database of each gateway GW is transmitted (or read by) to the gateway manager GM to feed a manager database DBM.

The manager database DBM contains the secondary vectors SV stored in correspondence respectively with identifiers IdGW of the gateways. The manager database DBM is linked to the gateway manager GM, being included in the gateway manager or implemented in another entity accessible by the gateway manager.

The gateway manager GM further manages a pairing database DBP that contains primary vectors PV in correspondence respectively with identifiers IdGW of the gateways that have been paired with communication devices.

A primary vector PV contains an identifier IdGW of a gateway, an identifier IdC of channel, an identifier IdCD of a communication device and quality metrics, and eventually encryption key, wherein the gateway is paired with the communication device.

Considering there is a number "m" of gateways GW and a number "Y" of channels per gateways, it can be assumed that there is a number "m×Y" of primary vectors in the pairing database DBP. If a given channel of a gateway is not used, i.e. there is a free space for pairing a communication device, the identifier IdC of said given channel can have a value equal to "0" or "NULL" or any value indicating that the channel is free.

The pairing database DBP is updated regularly with the content of the gateway database of each gateway GW. At regular time intervals, for example every "L" seconds with "L" being an integer, the content of the pairing database DBP is updated regularly with the manager database DBM.

If a communication device is still paired with a gateway, the values of the quality metrics of a primary vector with a given identifier IdGW of the gateway and a given identifier IdCD of the communication device are replaced with the values of the quality metrics of a secondary vector with the same given identifier IdGW of a gateway and the same given identifier IdCD of communication device.

If a communication device is unpaired with a previous gateway and paired with a new gateway, the values of the quality metrics of a primary vector with an identifier IdGW of the previous gateway, an identifier IdC of channel and an identifier IdCD of the communication device are replaced with the values of the quality metrics of a secondary vector with an identifier IdGW of the new gateway and a new identifier IdC of channel and the same identifier IdCD of communication device, the new gateway having allocated a new channel dedicated for the communication device and the previous gateway having freed the channel previously dedicated for the communication device.

Regularly, for example every "M" seconds with "M" being an integer, the gateway manager analyzes the secondary vectors of the manager database DBM having a time stamp included in a predefined time interval. The predefined time interval should encompass long enough period in order to detect communication devices having moved and sent messages once moved and should encompass short enough period in order to focus only on communication devices having moved lately.

The gateway manager GM analyzes the secondary vectors of the manager database DBM to detect if a communication device has been moved or if there is a structural change in the area (like a new wall, new metallic asset, etc. . . . ) and is now closer (in radio link quality point of view) to a different gateway than the one which it is paired with. It is assumed than the closer (in a radio context) to a gateway a communication device is, the better quality metrics of a message received by the gateway from the communication device are. But in some cases quality metrics of a message received by a farther gateway can be better than the quality metrics of a message received by a closer gateway, for example if there are obstacles between the communication device and said closer gateway that reduce the quality of the signal carrying the message.

Therefore the gateway manager GM compares the secondary vectors having the same identifier IdCD of communication device and a timestamp included in the predefined time interval. As the communication device sends a message in broadcast, different gateways can receive the message and the corresponding secondary vectors are stored in the manager database, said secondary vectors having the same identifier IdCD of communication device and having the identifier IdGW of the gateway having received the message. The gateway manager selects the secondary vector with higher quality metric among the compared secondary vectors.

Then the selected secondary vector is compared with a primary vector of the pairing database DBP having the same identifier IdCD of communication device. Said primary vector contains an identifier IdGW of the current paired gateway. If the quality metrics of the selected secondary vector are better than the quality metrics of the primary vector, the gateway manager commands the unpairing of the communication device with the gateway corresponding the identifier IdGW of gateway of the primary vector and further commands the pairing of the communication device with the gateway corresponding the identifier IdGW of gateway of the selected secondary vector.

The pairing of the communication device with the other gateway is done by selecting a free channel of the other gateway. The pairing database DBP is thus updated by replacing the identifier IdGW of gateway in the primary vector by the identifier IdGW of gateway of the selected secondary vector. As mentioned before, the values of the quality metrics of the primary vector are also replaced by the values of the quality metrics of the selected secondary vector. This update of pairing can be done by the gateway manager GM or the next time the pairing database DBP is updated with the content of the gateway database of each gateway GW.

In one embodiment, the gateway manager can further take into account other criteria in the comparison of quality metrics of the selected secondary vector and the primary vector. For example, in order to consider a variation of the signal strength, the gateway manager can compare the RSSI of the selected secondary vector to the RSSI of the primary vector added to a margin (for example 6 dB). For the new pairing, the RSSI of the selected secondary vector should be superior to the sum of the RSSI of the primary vector and said margin.

In another embodiment, a load balancing between the gateways can be taken into account, for example by selecting for new pairing preferably a gateway having more resources or more free channels.

The payload of a message sent by a communication device can be encrypted and only the gateway paired with the communication device can decrypt the payload. The encryption key is generated by the communication device after commissioning and can be exchanged with the first paired gateway according to different protocols. For example, a user action can be performed on a button of the communication device for triggering the pairing process during which security data are exchanged between the communication device and the gateway, the security data allowing the gateway to retrieve the encryption key. In case of encryption functionality, the encryption key of a communication device can be stored in the pairing data base DPB as part of the primary vector PV containing the identifier IdCD of said communication device.

In one embodiment, the gateway manager GM is able to collect the encryption keys associated with the communication devices from the gateways paired with the communication device. When a communication device is unpaired from a previous gateway and paired with a new gateway, the gateway manager is able to retrieve the encryption key associated with the communication device from the previous gateway and to transmit the encryption key to the new gateway. This automatic mechanism avoids any user action on the communication device for new pairing.

An embodiment comprises a gateway GW or a gateway manager GM under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Figure 2:
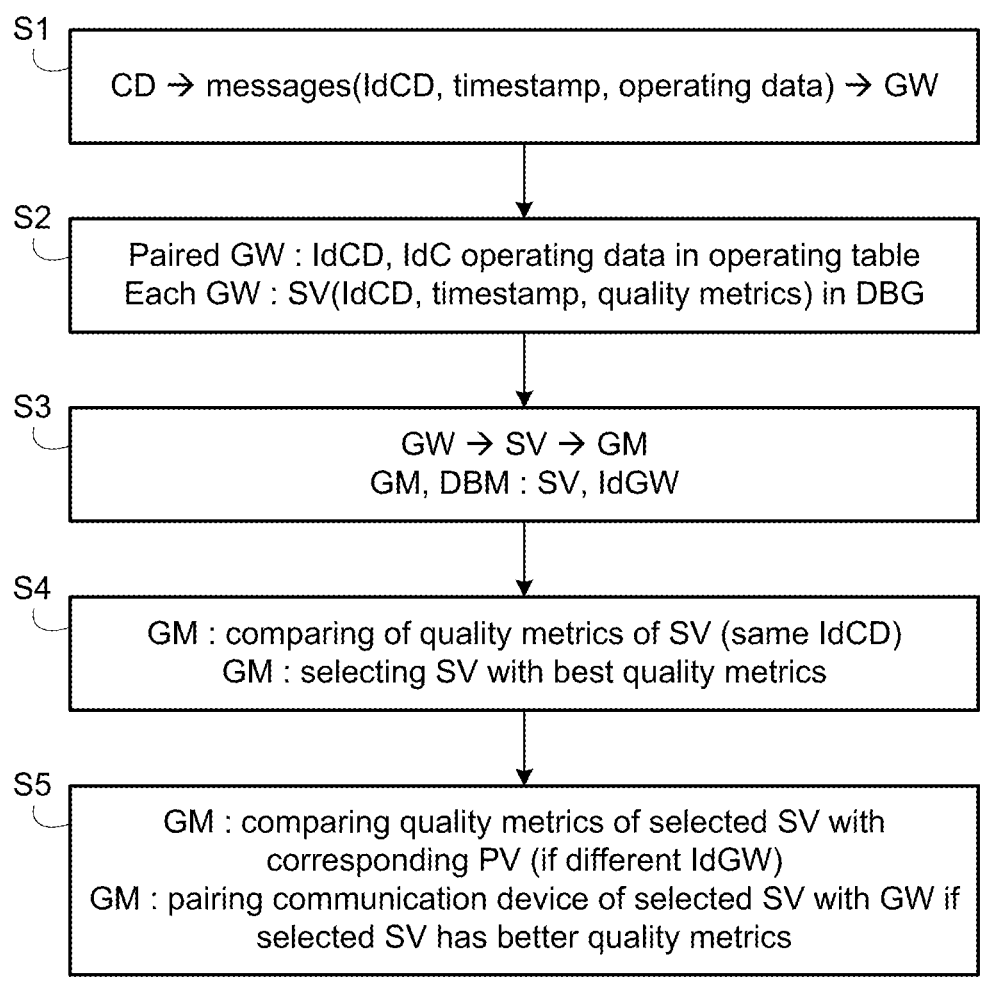
FIG. 2 shows a flow chart illustrating a method for managing mobility of communication devices according to one embodiment of the invention.

With reference to FIG. 2, a method for managing mobility of communication devices in a network having a star topology according to one embodiment of the invention comprises steps S1 to S5.

In step S1, the communication devices CD send messages in broadcast, for example at regular time intervals, after having performed a specific action, like a measure, or when an event occurs, for example a. human action, the end of a counter, or a detection of a piece.

Each message contains an identifier IdCD of communication device and operating data, like a status, an action report or a value of a measure.

The messages are received by gateways GW in the radio range of the communication devices. A message sent by a communication device can be received by one or more gateways, but only one gateway is paired with the communication device.

In step S2, each gateway GW analyses a received message, by extracting first the identifier IdCD of communication device contained in the received message. By means of the identifier IdCD of communication device, the gateway GW can distinguish if the received message is from a communication device that is paired or not paired with the gateway.

For a message sent by a communication device paired with the gateway, the gateway stores the operating data contained in the message with the IdCD of communication device and the identifier IdC of the channel associated with the communication device in an operating table.

For each message received by the gateway, the gateway determines quality metrics relating to the radio link between the gateway and the communication device having sent the message. The quality metrics can comprise, but not limited to, a received signal strength indicator (RSSI) and a link quality indicator (LQI).

For each received message, the gateway stores the identifier IdCD of communication device, the determined quality metrics and a timestamp in a gateway database DBG. The timestamp corresponds to the time of reception of the message. For a received message, the IdCD of communication device, the determined quality metrics and the timestamp form together a secondary vector SV for the message.

Every "N" seconds the operating table of each gateway GW is transmitted to the gateway manager GM and in parallel every "M" seconds the content of the gateway database DBG of each gateway GW is transmitted to the gateway manager GM. Also in parallel every "L" seconds the pairing data base DBP of the gateway manager GM is updated by reading the content of the gateway database of each gateway GW. The operating tables are aggregated in a global database accessed by different applications using operating data.

In step S3, the gateway manager GM collects the secondary vectors SV from all the gateways GW and stores the collected secondary vectors SV in correspondence respectively with identifiers IdGW of the gateways in the manager database DBM, In step S4, the gateway manager GM compares the quality metrics of secondary vectors SV having the same identifier IdCD of communication device and having timestamps included in a predefined time interval.

As a message sent by a communication device can be received by different gateways, the comparison of the quality metrics for a same communication device highlights the difference of quality of data packets and of signal of the messages respectively received by the gateways. For an efficient exploitation of the communication devices in the ecosystem, each communication device should be paired with the gateway presenting the best quality of received signal from the communication device.

The gateway manager GM selects a secondary vector SV with the best quality metrics among the compared secondary vectors. Considering the RSSI and LQI as quality metrics, it is selected the secondary vector SV having the higher RSSI and/or LQI.

In step S5, the gateway manager GM identifies the gateway currently paired with the communication device. To that end, the gateway manager GM identifies a primary vector PV having the same identifier IdCD of communication device as the selected secondary vector.

If the selected secondary vector and the identified primary vector have the same identifier IdGW of gateway, the gateway manager GM replaces the quality metrics of the primary vector by the quality metrics of the selected second vector.

If the selected secondary vector and the identified primary vector have a different identifier IdGW of gateway, the gateway manager GM compares quality metrics of the selected secondary vector with quality metrics of the primary vector PV.

If the selected secondary vector SV has higher quality metrics than the given primary vector, the gateway manager GM commands the pairing of the communication device corresponding to the identifier of communication device of the selected secondary vector with the gateway corresponding to the identifier IdGW of a gateway of the selected secondary vector. Usually, said results with higher quality metrics mean that the communication device has moved and is now closer to the gateway corresponding to the selected secondary vector than to the gateway it was currently paired with.

To command the pairing of the communication device with the gateway, the gateway manager GM sends instructions to said gateway to allocate a dedicated channel for communication with the communication device. The pairing process is only done at the gateway level in view of the received instructions. More especially, the instructions may comprise an identifier IdC of channel and the encryption key associated with the communication device.

In another embodiment, a load balancing between the gateways can be taken into account, for example by selecting for new pairing preferably gateway having more resources or more free channels.

In another embodiment, the type of communication device can be taken into account, as a gateway may support only a limited number of communication devices of a given type. The type of communication device can be retrieved from the identifier IdCD of communication device.

In one embodiment, the gateway manager GM compares the selected secondary vector with the primary vector PV only if the gateway corresponding to the selected secondary vector has at least one free channel for new pairing.

In one embodiment, the gateway manager compares the RSSI of the selected secondary vector to the RSSI of the primary vector added to a margin (for example 6 dB). The gateway manager GM commands the new pairing of the communication device if the RSSI of the selected secondary vector is higher than to the sum of the RSSI of the primary vector and said margin.

Furthermore, if the selected secondary vector SV has higher quality metrics than the given primary vector, the gateway manager GM commands the unpairing of the communication device corresponding to the identifier of communication device of the selected secondary vector with the gateway corresponding to the identifier IdGW of a gateway of the primary vector. In other words, the gateway manager GM commands the unpairing of the communication device from the currently paired gateway.

The unpairing and pairing process for a communication device can be done substantially in parallel, i.e. the unpairing process can precede the pairing process or the pairing process can precede the unpairing process.

To command the unpairing of the communication device with the currently paired gateway, the gateway manager GM sends instructions to said gateway to remove the dedicated channel for communication with the communication device and optionally to delete the encryption key associated with the communication device.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. A method for managing mobility of communication devices, wherein a gateway manager is connected to a set of gateways, each gateway being paired with at least one communication device through wireless links and each communication device being paired to only one gateway, wherein a pairing database linked to the gateway manager comprises primary vectors each containing an identifier of a given gateway, an identifier of a given communication device paired to the given gateway and quality metrics pertaining to a radio link between the given gateway and the given communication device, the method comprising:

the gateways receiving messages sent in broadcast from communication devices, each message containing an identifier of communication device and operating data, wherein only a gateway paired with a given communication device is able to process the operating data of a message sent by the given communication device to transmit to the gateway manager the operating data which are used by applications, the gateways determining quality metrics for each received message, the quality metrics pertaining to the radio link between the gateway and the communication device, the gateways storing, for each received message, a secondary vector comprising the identifier of the communication device, a timestamp and the quality metrics, the gateway manager collecting the secondary vectors from all the gateways and storing the collected secondary vectors in correspondence respectively with identifiers of the gateways in a manager database, the gateway manager selecting, based on the quality metrics, a secondary vector among secondary vectors that contain the same identifier of communication device and contain timestamps included in a predefined time interval, the gateway manager commanding a new pairing of the communication device corresponding to the identifier of communication device of the selected secondary vector with the gateway corresponding to the identifier of a gateway of the selected secondary vector instead of a gateway with which the communication device corresponding to the identifier of communication device of the selected secondary vector is currently paired, if the selected secondary vector has better quality metrics than a given primary vector having the same identifier of communication device in the pairing database and if the selected secondary vector has an identifier of gateway different from the identifier of gateway of said given primary vector.

2. The method according to claim 1, wherein the gateway manager and the gateways form a network with star topology.

3. The method according to claim 1, wherein the gateway manager is further configured to command the unpairing of the communication device corresponding to the identifier of communication device of the selected secondary vector with the gateway corresponding to the identifier of a gateway of said given primary vector.

4. The method according to claim 1, wherein the gateway manager selects the secondary vector with the best quality metrics among the compared secondary vectors.

5. The method according to claim 1, wherein the quality metrics comprise a received signal strength indicator and a link quality indicator.

6. The method according to claim 1, wherein the pairing database is updated regularly with the secondary vectors stored by the gateways by replacing values of the quality metrics of a primary vector having a given identifier of a gateway and a given identifier of communication device with values of the quality metrics of a secondary vector having the same given identifier of a gateway and the same given identifier of communication device.

7. The method according to claim 1, wherein the gateway manager compares the quality metrics of the selected secondary vector to the quality metrics of the primary vector added to a margin and commands the new pairing of the communication device if the quality metrics of the selected secondary vector is higher than to the sum of the quality metrics of the primary vector and said margin.

8. The method according to claim 1, wherein a gateway that is paired with a communication device allocates a dedicated channel by reserving memory zones for storing operating data coming from the communication device.

9. The method according to claim 1, wherein each gateway is paired with at least one communication device through one of Bluetooth or Zigbee wireless links.

10. A system comprising a gateway manager and gateways connected to the gateway manager, each gateway being paired with at least one communication device through wireless links and each communication device being paired to only one gateway, the system comprising:
- a pairing database linked to the gateway manager and comprising primary vectors each containing an identifier of a given gateway, an identifier of a given communication device paired to the given gateway and quality metrics pertaining to a radio link between the given gateway and the given communication device,
- the gateways configured to receive messages sent in broadcast from communication devices, each message containing an identifier of a communication device and operating data, wherein only a gateway paired with a given communication device is able to process the operating data of a message sent by the given communication device to transmit to the gateway manager the operating data which are used by applications,
- the gateways configured to determine quality metrics for each received message, the quality metrics pertaining to the radio link between the gateway and the communication device,
- the gateways configured to store, for each received message, a secondary vector comprising the identifier of the communication device, a timestamp and the quality metrics,
- the gateway manager configured to collect the secondary vectors from all the gateways and storing the collected secondary vectors in correspondence respectively with identifiers of the gateways in a manager database,
- the gateway manager configured to select, based on the quality metrics, a secondary vector among secondary vectors that contain the same identifier of communication device and contain timestamps included in a predefined time interval,
- the gateway manager configured to command a new pairing of the communication device corresponding to the identifier of communication device of the selected secondary vector with the gateway corresponding to the identifier of a gateway of the selected secondary vector instead of a gateway with which the communication device corresponding to the identifier of communication device of the selected secondary vector is currently paired, if the selected secondary vector has better quality metrics than a given primary vector having the same identifier of communication device in the pairing database and if the selected secondary vector has an identifier of gateway different from the identifier of gateway of said given primary vector.

11. A non-transitory computer-readable medium having embodied thereon a computer program, which when executed by a processor, causes the method according to claim 1 to be performed.

* * * * *